United States Patent [19]
Zumberge et al.

[11] Patent Number: 5,637,797
[45] Date of Patent: *Jun. 10, 1997

[54] OPTICAL FIBER GRAVITY METER

[75] Inventors: Mark A. Zumberge, San Diego; Eric L. Canuteson, La Jolla; Paul R. Parker, San Diego, all of Calif.

[73] Assignee: The Regents of the University of California, Oakland, Calif.

[*] Notice: The term of this patent shall not extend beyond the expiration date of Pat. No. 5,461,914.

[21] Appl. No.: 475,698

[22] Filed: Jun. 7, 1995

Related U.S. Application Data

[63] Continuation of Ser. No. 212,731, Mar. 14, 1994, Pat. No. 5,461,914.
[51] Int. Cl.⁶ .................................................. G01M 1/12
[52] U.S. Cl. ........................................ 73/382 R; 73/382 G
[58] Field of Search .......................... 73/514.26, 514.16, 73/382 R, 382 G

[56] References Cited

U.S. PATENT DOCUMENTS

| | | | |
|---|---|---|---|
| 4,322,829 | 3/1982 | Davis, Jr. et al. | 73/653 |
| 4,419,891 | 12/1983 | Brwning | 73/382 G |
| 4,445,371 | 5/1984 | Lautzenhiser | 73/382 R |
| 4,829,821 | 5/1989 | Carome | 73/517 R |
| 4,900,919 | 2/1990 | Twerdochib | 73/517 R |
| 4,992,656 | 2/1991 | Clauser | 73/382 G |
| 5,461,914 | 10/1995 | Zumberge et al. | 73/382 R |

*Primary Examiner*—Richard Chilcot
*Assistant Examiner*—Max H. Noori
*Attorney, Agent, or Firm*—Fuess & Davidenas

[57] ABSTRACT

A gravity meter has a portable housing for holding a corner cube retroreflector that can be dropped within the housing. The housing also holds a laser and an optical fiber having a first end in light communication with the laser. Additionally, the fiber has a second end which terminates at a ferrule. Light from the laser propagates through the optical fiber, and a portion of the light is reflected by the second end of the fiber back through the optical fiber to a beam splitter, while another portion of the light propagates through the second end of the fiber and is reflected by the falling corner cube back through the fiber to the beam splitter. The two reflected portions of the laser light interfere with each other to generate an interference fringe pattern which is extracted by the beam splitter. Data points representing the fringe pattern are extracted at a constant sampling frequency, and a nonlinear least squares fit is used to iteratively fit the data points to a sinusoidal function representative of the fringe pattern to determine the acceleration of the corner cube (and, hence, the gravitational acceleration).

11 Claims, 6 Drawing Sheets

Microfiche Appendix Included
(3 Microfiche, 117 Pages)

OPTICAL FIBER GRAVITY METER

The present invention is a continuation application of U.S. patent application Ser. No. 08/212,731 filed Mar. 14, 1994, now U.S. Pat. No. 5,461,914, for an invention entitled "OPTICAL FIBER GRAVITY METER" in the name of the present inventors and assigned to the same assignee as the present invention, from which application priority is claimed under 35 U.S.C. §120 and which application is incorporated herein by reference.

FIELD OF THE INVENTION

The present invention relates generally to scientific measuring apparatus, and more particularly to gravity meters. 3 microfiches containing 117 pages is presented in appendix A hereto, which are fully incorporated into the present disclosure, set forth a complete program listing of the code used in determining local gravitational acceleration.

BACKGROUND

Gravity measurements are used in several industrial applications. For example, by precisely measuring the local gravitational acceleration at a predetermined point on the earth's surface, an inference can be made regarding the composition of the material beneath the point, and in particular whether the material beneath the point contains oil. In other words, precisely measuring the gravitational acceleration, frequently denoted by the symbol "g", can aid in oil exploration.

Additionally, precise measurements of local gravitational acceleration "g" can be used in many scientific applications, and in particular the study of plate tectonics. Plate tectonics is a branch of geoscience which hypothesizes that the earth's crust is divided into several large tectonic plates, each of which essentially independently floats on the earth's mantle. Under the plate tectonics hypothesis, seismic and volcanic activity result from the movements of tectonic plates relative to each other. Because, among its other attributes, plate tectonics appears to be a viable explanation of the causes of devastating earthquakes and volcanic activity, much scientific research has been undertaken to better understand plate tectonics.

It happens that a knowledge of the magnitude of the gravitational acceleration at various locations on the earth helps to gain insight into plate tectonics. For example, details of magma injection and fault rupture can be investigated by mapping vertical displacements of benchmarks on the surface of the earth. Of course, the magnitude of the gravitational acceleration associated with a particular benchmark changes as the distance between the benchmark and the center of the earth changes. Accordingly, gravity meters for precisely determining the magnitude of the gravitational acceleration at various locations have been introduced for measuring the absolute vertical movement of benchmarks on the surface of the earth.

Preferably, such apparatus are portable, to facilitate field measurements of the gravitational acceleration. One portable gravity meter is disclosed by Zumberge et al. in the periodical "Metrologia", volume 18, pp. 145–152 (1982). The Zumberge et al. gravity meter disclosed in "Metrologia" includes a Michelson interferometer. A Zeeman laser is used as the light source, and the light beam generated by the laser is split into two so-called "arms", one of which is terminated by a cube corner retroreflector which is allowed to be freely accelerated by the Earth's gravity. The other "arm" is reflected off a non-moving surface, and the two reflected "arms" interfere with each other.

As is well-known in the art, the interference of the two "arms" results in the generation of interference fringes. The characteristics of these interference fringes are representative of the acceleration of the cube corner retroreflector (and, hence, of the gravitational acceleration). More particularly, by measuring the time between fringes, the gravitational acceleration can be determined.

While effective for its intended purpose, it happens that the 1982 Zumberge et al. gravity meter is susceptible to output signal noise attributable to acoustic vibrations (e.g., vibrations caused by seismic activity). More specifically, in the 1982 Zumberge et al. gravity meter, as in most if not all gravity meters, high frequency vibrations affect one "arm" of the interferometer differently that they affect the other "arm", because one "arm" is isolated from such vibrations while the other "arm" (i.e., the "arm" terminated by the retroreflector) is not. This results in output signal noise which reduces the precision of the measurement of the gravitational acceleration. Not surprisingly, to best understand plate tectonics, extremely precise measurements of the gravitational acceleration are desirable.

Further, the above-mentioned Zumberge et al. device, like previous gravity meters, is designed for use on dry land. It happens, however, that many geoscience experiments, as well as a significant mount of oil exploration, require measuring the gravitational acceleration at various points on the sea floor.

Up to now, such measurements have been conducted using pressure sensors and sound sensors. Unfortunately, pressure sensor-based instruments are subject to long-term drift, and instruments using sound sensors present a host of additional difficulties which have never yet been satisfactorily overcome. Hence, it would be desirable to provide a gravity meter for measuring vertical displacement of the sea floor.

It will be appreciated that gravity meters which are to be used in such experiments must be enclosed in watertight pressure vessels, which can be expensive to make, particularly in large sizes. Accordingly, gravity meters used in ocean floor experiments are preferably even more compact than the above-mentioned Zumberge, et al. device, to permit the use of relatively small pressure vessels.

It accordingly is an object of the present invention to provide a gravity meter which reduces output signal noise. Another object of the present invention is to provide a portable gravity meter. Still another object of the present invention is to provide a gravity which is easy to use and cost-effective to manufacture.

SUMMARY OF THE INVENTION

A gravity meter includes a laser for generating a light beam and an optical fiber which has a first end in light communication with the laser. Also, the fiber has a second end, and the second end of the fiber establishes a fixed reflector for reflecting a first portion of the light beam back through the optical fiber. Further, the second end of the fiber permits a second portion of the light beam to propagate through the fixed reflector.

A seismometer mass holds the fixed reflector to attenuate the propagation of vibrations to the fixed reflector, and a droppable reflector is disposed in light communication with the second end of the fiber for reflecting the second portion of the first beam back through the optical fiber. A detector is positioned in light communication with the first and second portions of the light beam. The detector detects interference fringes generated by the interaction between the first and second portions of the light beam which are representative of the displacement of the droppable reflector relative to the fixed reflector.

Preferably, the gravity meter includes an evacuated chamber in which the droppable reflector is disposed, and an elevator selectively holds the droppable reflector. In accordance with the present invention, the elevator can be distanced from the droppable reflector to cause the droppable reflector to freely fall, and the elevator gradually decelerates to gently contact the droppable reflector. A computer is provided for controlling the elevator and for determining the gravitational acceleration based upon the interference fringes.

Additionally, a waveform digitizer is electrically connected to the computer for sampling the interference fringes at a predetermined sampling frequency. Moreover, a collimator is disposed adjacent the second end of the fiber for collimating light, and a pressure vessel is provided for holding the laser and reflectors.

As intended by the present invention, the pressure vessel includes a center ring, a bottom, and a plurality of levelling legs attached to the center ring. The levelling legs include respective lead screws disposed in respective cylinders, with each lead screw being reciprocatingly disposed in its associated cylinder for adjusting the orientation of the pressure vessel with respect to the earth. Advantageously, the elevator is coupled to the center ring, the bottom of the pressure vessel includes a resilient surface, and the seismometer mass is mounted on the resilient surface. Consequently, the optical fiber's second end, which is attached to the seismometer mass and which establishes the fixed reflector, is isolated from vibrations induced by the elevator and droppable reflector.

In another aspect of the present invention, an apparatus includes a light source for generating a light beam and an optical fiber optically coupled to the light source for transmitting the light beam. A first reflector is operably positioned for reflecting the light beam from the optical fiber, and the first reflector is positioned such that no relative motion occurs between the first reflector and the optical fiber. Moreover, a second reflector is positioned for reflecting the light beam from the optical fiber. The second reflector can be selectively accelerated under the influence of gravity relative to the first reflector, so that reflected light from the second reflector interferes with reflected light from the first reflector to generate interference fringes. A light processor is positioned for receiving the interference fringes and for determining the magnitude of the acceleration of the second reflector relative to the first reflector in response thereto.

In yet another aspect of the present invention, a portable gravity meter is disclosed for determining gravitational acceleration. The gravity meter includes a portable housing and a laser mounted in the housing. Also, an interferometer is mounted in the housing. In accordance with the present invention, the interferometer includes a movable reflector which is mounted in the housing such that the movable reflector can be accelerated by gravity. Also, the interferometer includes a fixed reflector mounted in the housing in a stationary relationship with the housing, and an optical guide establishes a first optical path between the laser and the movable reflector and a second optical path between the laser and the fixed reflector. Vibrations that affect the first optical path affect the second optical path equally.

In still another aspect of the present invention, a method is disclosed for determining the gravitational acceleration. The method of the present invention includes the steps of directing a laser beam against movable and fixed reflectors such that light reflected from one reflector interferes with light reflected from the other reflector to generate an interference fringe pattern. Then, an electrical signal representative of the fringe pattern is generated and sampled at a constant predetermined sampling frequency to generate a sampled signal. Next, the gravitational acceleration is determined based upon the sampled signal.

In another aspect of the present invention, a method for determining the gravitational acceleration based upon an interference fringe pattern includes detecting points of the fringe pattern, with each detected point being separated from its immediately adjacent points by a constant predetermined time period. The points are then iteratively fired to a sinusoidal function which is representative of the gravitational acceleration.

The details of the present invention, both as to its construction and operation, can best be understood in reference to the accompanying drawings, in which like numerals refer to like parts, and which:

DETAILED DESCRIPTION OF THE PREFERRED EMBODIMENT

Figure 1:
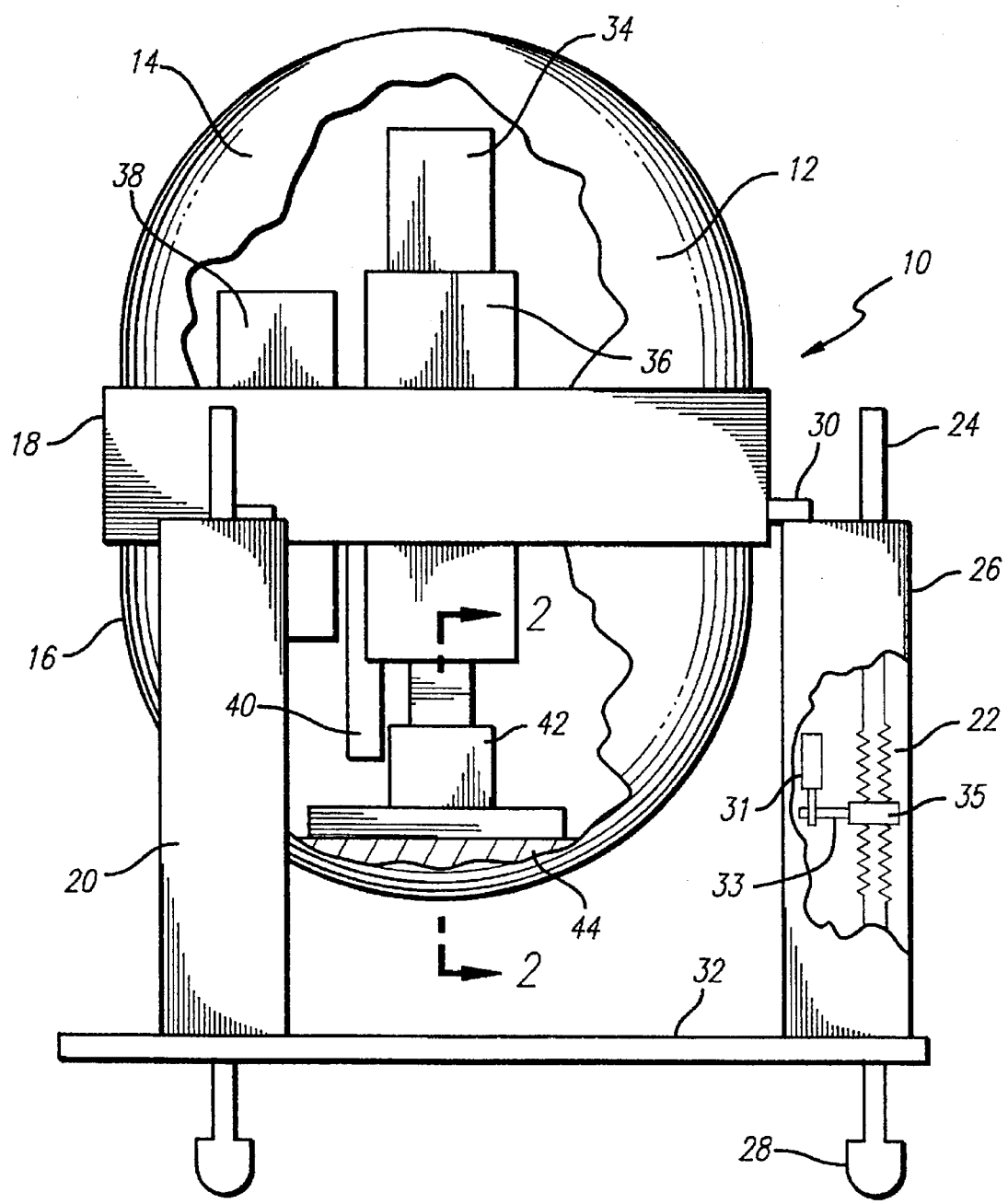
FIG. 1 is a side view of the gravity meter of the present invention, with portions of the pressure vessel cut away.

Referring initially to FIG. 1, gravity meter is shown, generally designated 10. As shown, the gravity meter 10 includes a housing, preferably a pressure vessel 12 which is made of one-inch thick aluminum. As intended by the present invention, the pressure vessel 12 is hollow, and the vessel 12 holds the optical and electronic processing components of the gravity meter 10.

In the presently preferred embodiment, the pressure vessel 12 includes a top shell 14 and a bottom shell 16, both of which are configured generally as hollow prolate hemispheres. The shells 14, 16 are both attached to an annular connecting ring 18. Also, three levelling legs (only leveling legs 20, 22 shown in FIG. 1) are attached to the connecting ring 18.

It is to be appreciated in reference to FIG. 1 that the levelling legs 20, 22 are adjustable, whereas the third levelling leg (not shown) is not. More specifically, taking the levelling leg 22 as an example, the levelling leg 22 includes a threaded lead screw 24 which is movably mounted in a fluid-filled cylinder 26, and the lead screw 24 has a pad 28 for contacting the sea floor. As shown in FIG. 1, the cylinder 26 is bolted to a mount 30, and the mount 30 is in turn formed integrally with the connecting ring 18. Preferably, the cylinder 26 is filled with a low viscosity fluid (e.g. the fluid marketed by 3M Corporation as "Fluorinert").

As intended by the present invention, a motor 31 is mounted in the cylinder 26 and is mechanically coupled by, e.g., a gear coupling 33 to a rotatable nut 35 for rotating the nut 35. In turn, the nut 35 is threadably engaged with the lead screw 24 for causing the lead screw 24 to reciprocate within the cylinder 26 when the nut 35 is caused to rotate by the motor 31. Consequently, it will be appreciated that when the lead screw 24 is reciprocated relative to the cylinder 26, the orientation of the pressure vessel 12 with respect to the sea floor is adjusted thereby.

Furthermore, the levelling legs 20, 22, in addition to being operably connected to the connecting ring 18 through their respective cylinders, are also supported by an annular base 32. More specifically, as shown in FIG. 1, the lead screw 24 is journaled in the base 32.

FIG. 1 further shows that the pressure vessel 12 holds a hollow cylindrical vacuum chamber 34. Also, the pressure vessel 12 holds an electrical assembly casement 36. It is to be understood that the electrical assembly casement 36 holds the computer and associated electrical components of the present invention more fully disclosed below.

Additionally, a laser 38 is mounted in the pressure vessel 12. Preferably, the laser 38 is a helium neon laser which is wavelength stabilized, e.g., an NL-1 laser made by Newport Corporation of Fountain Valley, Calif. Further, a rubidium time standard 40 is mounted the pressure vessel 12. The rubidium time standard 40 and laser 38 are electrically connected to the components within the electrical assembly casement 36. In accordance with the present invention, the vacuum chamber 34, electrical assembly casement 36, laser 38, and time standard 40 are all supported on the connecting ring 18.

Still referring to FIG. 1, an interferometer 42 is mounted in the pressure vessel 12. In contrast to the other components mounted within the pressure vessel 12, however, the interferometer 42 rests on a resilient epoxy material 44. Thus, while components within the interferometer 42 are within line-of-sight of components within the vacuum chamber 34 as more fully disclosed below, the interferometer 42 is not mechanically coupled directly to the vacuum chamber 34. Thus, vibration of the vacuum chamber 34, as well as vibrations within the other components that are supported by the connecting ring 18, are substantially isolated from the interferometer 42.

Figure 2:
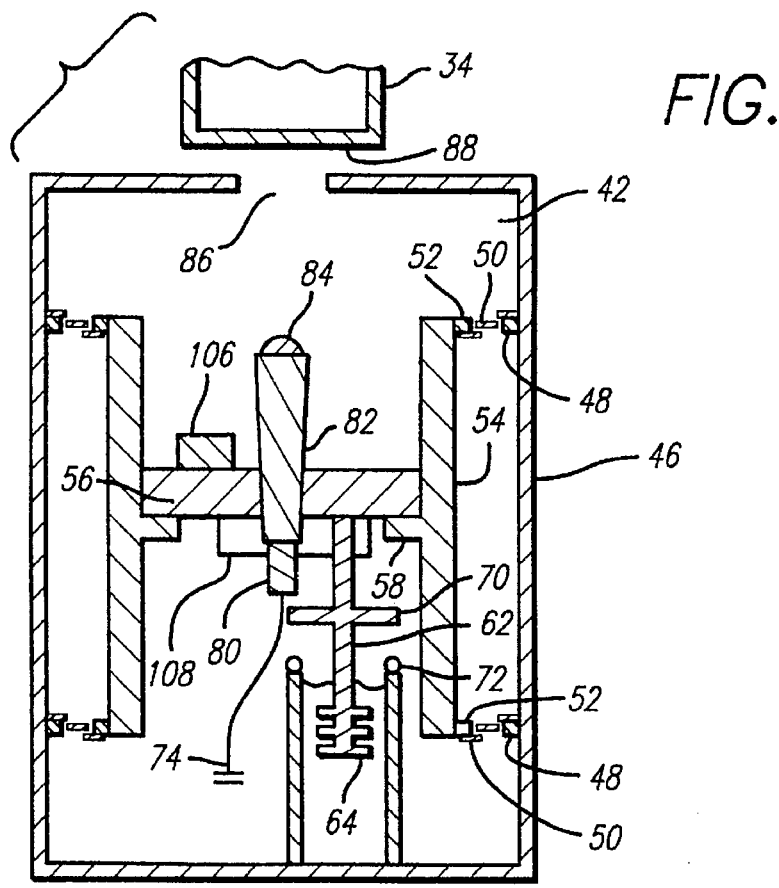
FIG. 2 is a cross-sectional view of the optical fiber interferometer of the gravity meter of the present invention, as seen along the line 2—2 in FIG. 1.

Referring now to FIG. 2, the details of the interferometer 42 can be seen. As shown, the interferometer 42 includes a hollow cylindrical case 46. The case 46 is formed with a plurality of, preferably two, spring mounts 48. Respective flexure springs 50 are welded or bolted to the spring mounts 48. In turn, each flexure spring 50 is welded or bolted to a respective mass mount 52.

As shown in FIG. 2, the mass mounts 52 are bolted to or formed integrally with a seismometer mass 54. An optics platform 56 rests upon a flange 58 of the seismometer mass 54. Accordingly, it will be appreciated by the skilled artisan that the seismometer mass 54 with optics platform 56 is substantially isolated from vibrations of the case 46 of the interferometer 42. In the presently preferred embodiment, the seismometer mass 54 with flexure springs 50 has velocity dependent damping and a free period of about one-half second (½ sec.) to attenuate vibrations caused by the dropping mechanism within the vacuum chamber 46, which are the most problematic in that they are phase correlated with the measurements.

To control the vibration isolation characteristics of the seismometer mass 54, a dashpot 60 is provided. The dashpot 60 includes a shaft 62 which is welded or bolted to the optics platform 56 and, as shown in FIG. 2, a plurality of disc-shaped damping blades 64 are formed on the shaft 62. A dashpot container 66 is mounted on the case 46, and the dashpot container 66 holds a damping fluid 68. As shown, the blades 64 are disposed within the damping fluid 68 to further isolate the seismometer mass 54 with optics platform 56 from vibrations of the case 46.

If desired, a ceiling flange 70 can be formed on the shaft 62. The ceiling flange 70 can be held against an annular seal 72 on the dashpot container 66 during transportation of the gravity meter 10.

Still referring to FIG. 2, an optical fiber 74 is disposed within the case 46. The optical fiber 74 is preferably a single mode optical fiber made of fused silica. It is to be understood that the optical fiber 74 has an end (not shown) which is in light communication with the laser 38 shown in FIG. 1. Also, as shown in FIG. 3, the optical fiber 74 has a polished end 76 which, as more fully disclosed below, establishes a fixed photon reflector.

A segment 78 of the optical fiber 74 is disposed within a glass ferrule 80. In turn, the ferrule 80 is held within a ferrule holder 82, as shown in FIG. 2, and the ferrule holder 82 is mounted on the optics platform 56. Accordingly, as will be appreciated by the skilled artisan, the end 76 of the optical fiber 74 (i.e. the fixed reflector of the present invention) is substantially isolated from vibrations of the case 46. Stated differently, vibrations of the case 46 which may be caused, e.g. by ground vibrations and/or vibrations emanating from the vacuum chamber 34, are substantially attenuated as the vibrations propagate toward the end 76 of the optical fiber 74.

Figure 3:
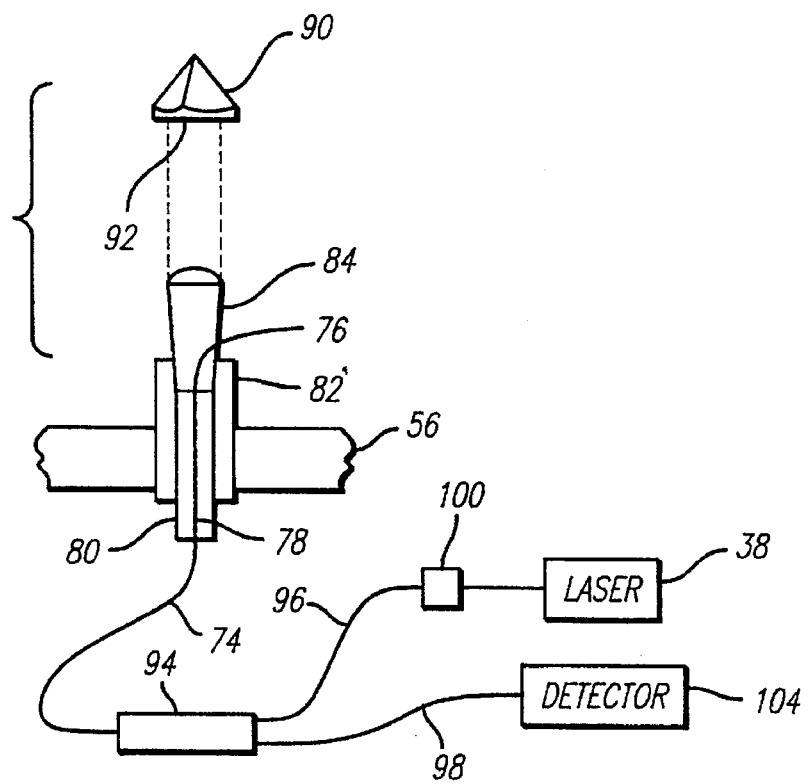
FIG. 3 is a schematic diagram of the optical components of the gravity meter.

Still referring to FIGS. 2 and 3, a beam collimating lens 84 is positioned against the ferrule 80 for collimating light which propagates through the end 76 of the optical fiber 74. The light so collimated propagates through an opening 86 which is formed in the case 46. From the opening 86, the light continues through a transparent bottom cover 88 of the vacuum chamber 34.

In cross reference to FIGS. 2 and 3, a cube retroreflector 90 is movably positioned within the vacuum chamber 34. In accordance with the present invention, the cube retroreflector 90 establishes a movable reflector. More particularly, the retroreflector 90 has polished surfaces 92 which establish a movable reflector. Accordingly, as can be appreciated best in cross-reference to FIGS. 2 and 3, light from the optical fiber 74 which propagates through the transparent bottom cover 88 of the vacuum chamber 34 can be reflected by the reflecting surfaces 92 of the cube retroreflector 90 and pass back into the end 76 of the optical fiber 74.

FIG. 3 also shows that the optical fiber 74 is connected to a beam splitter 94. In turn, the beam splitter 94 is connected to a laser connector fiber 96 and to a detector fiber 98. The laser connector fiber 96 is connected to a one-quarter pitch laser gradient index (GRIN) lens 100.

As shown in FIG. 3, the laser GRIN lens 100 is in light communication with the laser 38, and the fiber 98 is in light communication with a light detector 104. Preferably, the light detector 104 is a photodiode detector. It is to be understood that the ends of the connector fibers 96, 98 are polished, as is the end 76 of the optical fiber 74.

Figure 4:
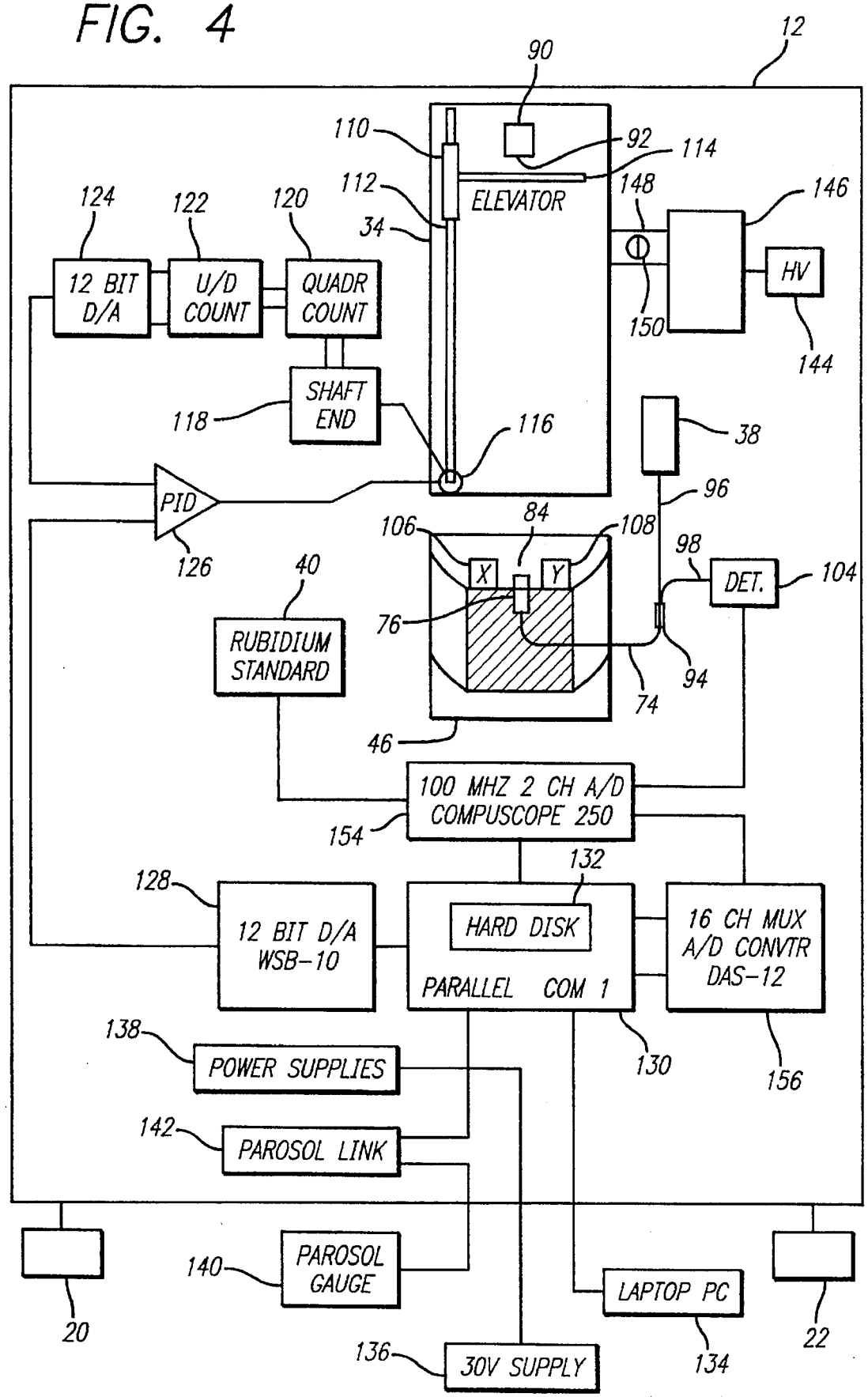
FIG. 4 is a schematic diagram showing the electrical components and the dropping mechanism of the gravity meter.

In brief cross-reference to FIGS. 2 and 4, two tiltmeters 106, 108 are mounted on the optics platform 56. Preferably, each tiltmeter 106, 108 is an electrolytic bubble tilt sensor made by Spectron. It is to be understood that the tiltmeters 106, 108 generate signals that are respectively representative of the orientation of the platform 56 in the x and y directions.

Now referring to FIG. 4, the electronic components of the gravity meter 10 and their schematic interrelationship with the mechanical components of the gravity meter 10 are schematically shown. It is to be understood that the purpose of the components shown in FIG. 4 are twofold—first, to effect a controlled droppage of the retroreflector 90, and second, to receive the interference fringes which are generated when the retroreflector 90 is dropped, and then calculate the gravitational acceleration based upon the received interference fringes.

As shown schematically in FIG. 4, an elevator 110 is reciprocatingly mounted on a guide rail 112, and both the elevator 110 and guide rail 112 are positioned in the vacuum chamber 34. The elevator 110 includes a horizontal surface 114 for holding the retroreflector 90. In other words, the retroreflector 90 can rest upon the surface 114 of the elevator 110. A drive motor 116 is positioned adjacent to guide rail 112 and is engaged with the elevator 110 by a stainless steel drive belt (not shown) for raising and lowering the elevator 110 within the vacuum chamber 34. The drive motor 116, guide rails 112, and elevator 110 together establish a dropping mechanism.

FIG. 4 shows that a shaft encoder 118 is electrically connected to the drive motor 116 for sensing the rotation of the rotor of the drive motor 116 and, hence, the vertical position of the elevator 110 with retroreflector 90.

Also, a quadrature counter 120 is connected to the shaft encoder 118 for determining the amount of rotation of the rotor of the motor 116. An up-down counter 122 with associated 12-bit digital-to-analog converter 124 is connected to the quadrature counter 120. In turn, the digital-to-analog converter 124 is electrically connected to a proportional integrator and differentiator servo 126, and the servo 126 is electrically connected to the drive motor 116.

Also, the servo 126 is electrically connected to a 12-bit digital-to-analog converter 128 (preferably a model WSB-10), and the converter 128 is connected to a computer 130. In the preferred embodiment, the computer 130 is a model 486 personal computer with associated hard disk 132. As will be more fully disclosed below, the computer 130 controls the operation of the drive motor 116 and, hence, the motion of the elevator 110.

Still referring to FIG. 4, a laptop personal computer (PC) 134 is connected to the computer 130 for controlling the operation of the computer 130. The laptop PC 134 is carried aboard a support vessel (not shown). Also, a power supply 136 is carried aboard the support vessel and is electrically connected to a plurality of power supplies (represented by the block 138 in FIG. 4) for energizing the electronic components of the gravity meter 10.

If desired, a pressure gauge 140 can also be provided. The pressure gauge 140 is electrically connected to a link 142 which is in turn connected to the computer 130. Preferably, the pressure gauge 140 and link 142 are made by Paro Scientific for indicating fluid pressure external to pressure vessel 12. As indicated in FIG. 4, the pressure link 142 is connected to the parallel port of the computer 130, whereas the laptop PC 134 is connected to the communications port of the computer 130.

It is to be further appreciated in reference to FIG. 4 that one of the power supplies 138 is connected to a high voltage power supply 144. More particularly, the high voltage power supply 144 receives a thirty (30) volt input voltage from the power supplies 138 and produces (i.e. generates) a five thousand (5,000) volt output voltage. The 5,000 volt output voltage is in turn sent to an ion pump 146, preferably an ion pump made by Varion. Fluid communication between the ion pump 146 and vacuum chamber 34 is established by a conduit 148, and a valve 150 is disposed in the conduit 148 for selectively blocking the conduit 148. The ion pump 146 maintains a vacuum within the vacuum chamber 34 of about one millionth of a millimeter of Mercury ($10^{-6}$ mm Hg).

It is to be further understood in reference to FIG. 4 that the laser 38 is connected to one of the power supplies 138 for energizing the laser 38. Also, the photon detector 104 is electrically connected to a one hundred megahertz (100 MHz) two-channel analog-to-digital converter 154. Preferably, the analog-to-digital converter 154 is a model CS-250 converter made by Gage Applied Sciences Inc. of Montreal, Canada.

As additionally shown in FIG. 4, the analog-to-digital converter 154 is electrically connected to the rubidium standard 40, the computer 130, and to a multiplex (MUX) analog-to-digital converter 156. Preferably, the analog-to-digital converter 156 is a model DAS-12 converter. The MUX analog-to-digital converter 156 receives various input signals including signals representative of the vacuum within the vacuum chamber 34 and the temperature within the vacuum chamber 34. Also, the MUX analog-to-digital converter 156 receives signals from the x and y tilt sensors 106, 108.

Furthermore, the MUX analog-to-digital converter 156 is connected to the levelling legs 20, 22 for controlling the levelling legs 20, 20 in response to signals from the computer 130 which are based upon signals from the tiltmeters 106, 108. In other words, the levelling legs 20, 22 are controlled to maintain the gravity meter 10 in a substantially vertical orientation with respect to the surface of the earth.

Figure 5:
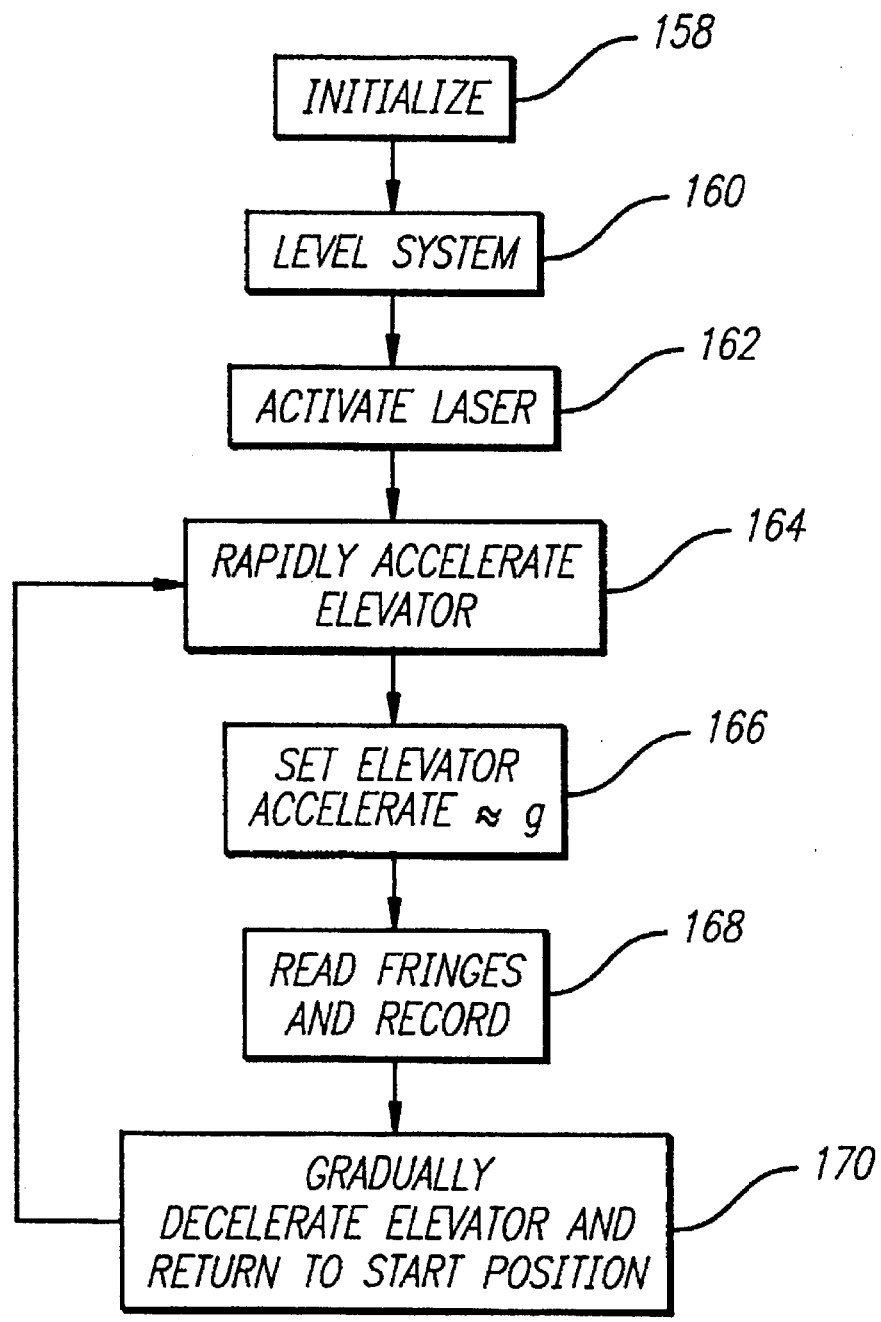
FIG. 5 is a block diagram showing the operational steps of the present invention.

Now referring to FIG. 5, the operation of the present invention can be seen. As indicated at block 158, the computer 130 initializes the system shown in FIG. 4. Then, as indicated in block 160, the system is levelled. More specifically, under operator control the computer 130, through the MUX analog-to-digital converter 156 adjusts the levelling legs 20, 22 as appropriate to orient the gravity meter 10 in a vertical position as indicated by the tiltmeters 106, 108.

Then, the laser 38 is activated at block 162. Next, at block 164, the elevator 110 is rapidly accelerated downwardly. More specifically, the computer 130, through the servo 126, energizes the drive motor 116 to rapidly drive the elevator 110 downwardly such that the surface 114 of the elevator 110 is distanced by a few millimeters from the retroreflector 90. Once the surface 114 of the elevator 110 has been marginally distanced from the retroreflector 90, the downward acceleration of the elevator 110 is slowed to approximate the gravitational acceleration g. It is to be appreciated that at this point, both the elevator 110 and retroreflector 90 are accelerating downwardly at about the same rate.

As the retroreflector 90 accelerates downwardly under the influence of gravity, light from the laser 38 propagates through the connecting fiber 96 and optical fiber 74. A first portion of the light propagates past the end 76 of the optical fiber 74. This first portion of light impinges upon the surface 92 of the retroreflector 90 and is reflected back into the polished end 76 of the optical fiber 74. The first portion of light then propagates back through the optical fiber 74.

Moreover, a second portion of light from the laser 38 propagates through the connecting fiber 96 and optical fiber 74 and is reflected off of the polished end 76 of the optical fiber 74. The first and second portions of light interfere with each other within the optical fiber 74 to generate interference fringes.

As the skilled artisan will appreciate, the optical fiber 74, in combination with the space within the vacuum chamber 46, is essentially an optical guide which establishes a first optical path between the laser 38 and the retroreflector 90. Also, the optical fiber 74 establishes a second optical path between the laser 38 and the polished end 76 of the optical fiber 74. Further, the skilled artisan will appreciate that with the combination of structure disclosed above, vibrations affecting the first optical path affect the second optical path equally, became the only portion of the optical paths (i.e., the fiber 74) which are susceptible to vibration is common to both the first and second paths. Consequently, systemic errors arising from vibrations of one optical path which are not imposed on the other optical path are eliminated.

The interfering light passes through the beam splitter 94 to the detector 104. In turn, the detector 104 generates an electrical signal representative of the interference fringes and sends this signal to the analog-to-digital converter 154 and thence to the computer 130.

In the analog-to-digital converter 154, also known as a waveform digitizer, the signal from the detector 104 is digitized at a rate of about one million (1,000,000) samples per second, with each sample being temporally equidistant from its immediately preceding and succeeding samples. In other words, in the presently preferred embodiment, the analog-to-digital converter 154 samples the signal representing the interference fringes for about one-tenth of a second (0.1 sec), to obtain about 100,000 data points to essentially digitize the interference fringes. Other digitization rates may be used, e.g., one-half million samples per second. The digitized fringe is then recorded at block 168 for about one hundred milliseconds (100 ms) of the drop time of the retroreflector 90.

Near the end of the travel of the elevator 110 (and hence retroreflector 90), block 170 indicates that the computer 130 controls the servo 126 to gradually slow the elevator 110 such that the retroreflector 90 gently contacts the surface 114 of elevator 110 prior to reaching the end of the travel. The elevator 110 then returns to the start position. In the presently preferred embodiment, the above-described process is repeated a predetermined number of times to generate a plurality of digitized fringe signals. Each fringe signal is analyzed as disclosed below to determine a value for the gravitational acceleration "g", and the values so obtained are averaged.

Figure 6:
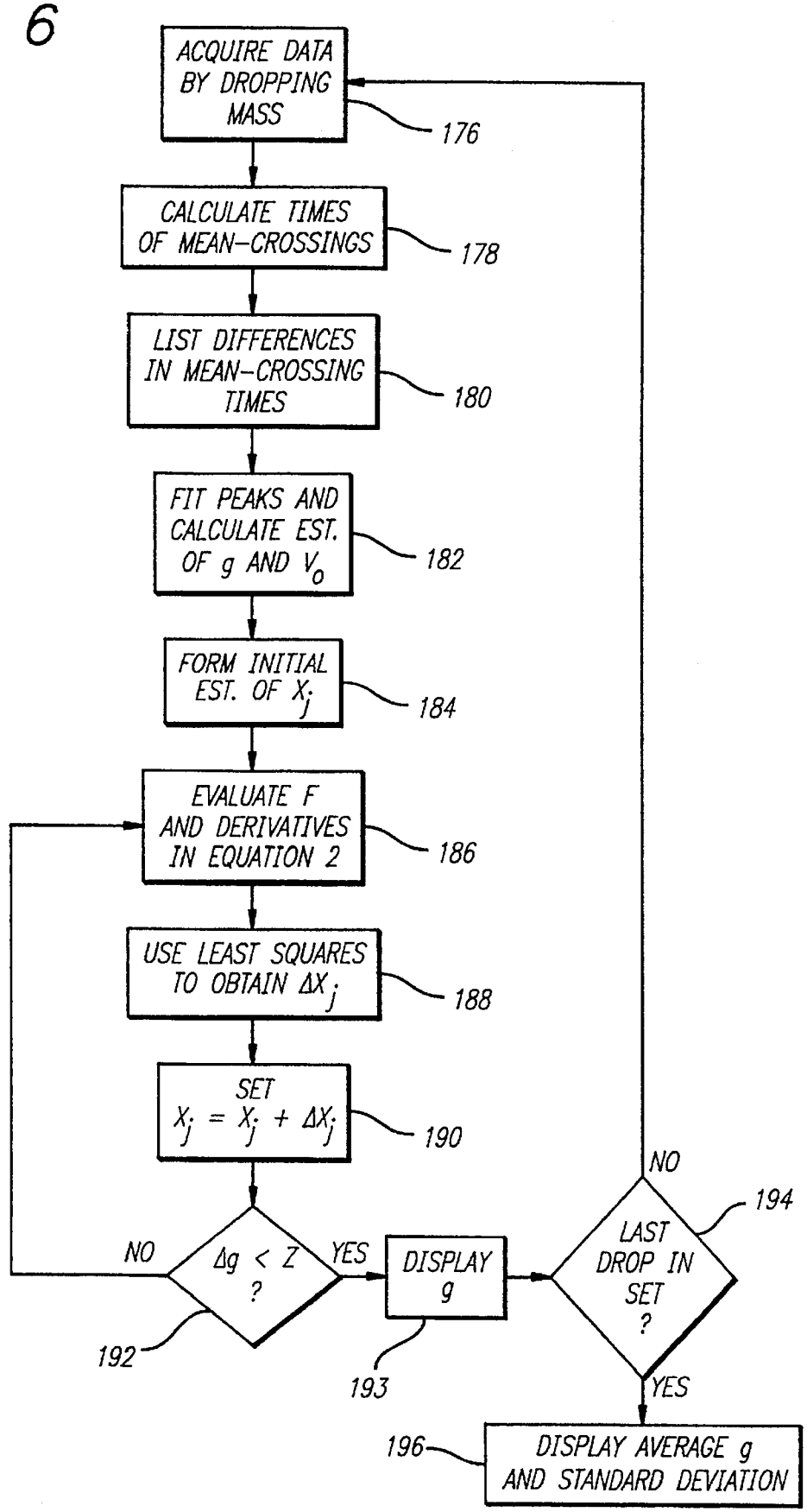
FIG. 6 is a block diagram showing the steps for determining the gravitational acceleration.

Now referring to FIG. 6, the method by which g is calculated from the observed fringe pattern may be seen. Recall that the analog-to-digital converter 154 samples the output signal of the detector 104 with a predetermined constant sampling frequency. The output of the analog-to-digital converter 154, accordingly, is an aliased sample signal which is representative of the true fringe signal generated by the detector 104. The true fringe signal is given by the equation $$f(x_j, t_i) = F + A \sin(\phi + v_0 s + \tfrac{1}{2}g t^2), \quad (1)$$

where $x_j$ has components ($x_1 = F$, $x_2 = A$, $x_3 = \phi_0$, $x_4 = v_0$, and $x_5 = g$), F is the offset from zero (a constant empirically determined that depends on the particular optical system), A is the amplitude of the fringe signal from the detector 104, $\phi_0$ is the initial position of the retroreflector 90 in terms of its optical phase position vis-a-vis the light beam from the laser 38, $k = 4\pi/\lambda$, $\lambda$ is the wavelength of the light generated by the laser 38, $v_0$ is the initial absolute downward velocity of the retroreflector 90, t is time, and g is the gravitational acceleration sought to be determined.

Equation (1) can be linearized as follows:

$$f(x_j, t_i) = f(x_j^0, t_i) + \Sigma_{j=1}^5 \Delta x_j [\delta/\delta x_j f(x_j, t_i)] \quad (2)$$

where $$x_j = x_j^0$$

First, an initial estimate of $v_0$ and g are obtained. Specifically, for the iterative process disclosed below to reliably converge, initial estimates of some of the parameters on the right side of equation (2) must be precisely made. More specifically, accurate initial estimates for the linear parameters in equation (2) are not required, because the Taylor expansion in Equation (2) is exact for these parameters. Initial estimates ($g^0$, $v^0{}_0$) for the non-linear parameters g and $v_0$, however, must be made which are relatively close to actual g and $v_0$.

To ensure convergence of the iterative process disclosed below it is desirable that $$|\tfrac{1}{2}(g^0 - g)\Delta t^2| \leq \tfrac{1}{2}\lambda$$

and $|(v^0{}_0 - v_0)\Delta t| \leq \tfrac{1}{2}\lambda$, where $\Delta t$ is the total time during which samples are analyzed, and $\lambda$ is the wavelength of the laser light used in the interferometer.

From the above equations, it is evident that decreasing $\Delta t$ relaxes the accuracy requirement of the initial estimates $g^0$, $v^0{}_0$. Accordingly, the algorithm disclosed in Appendix A starts its analysis with a short interval of data (taken near the beginning of the drop of the retroreflector 90) and then expands its scope to include the full set of digitized signals (represented in FIG. 7 as points "P") from the A/D converter 154 as successive iterations approach the final solutions for g, $v_0$.

Figure 7:
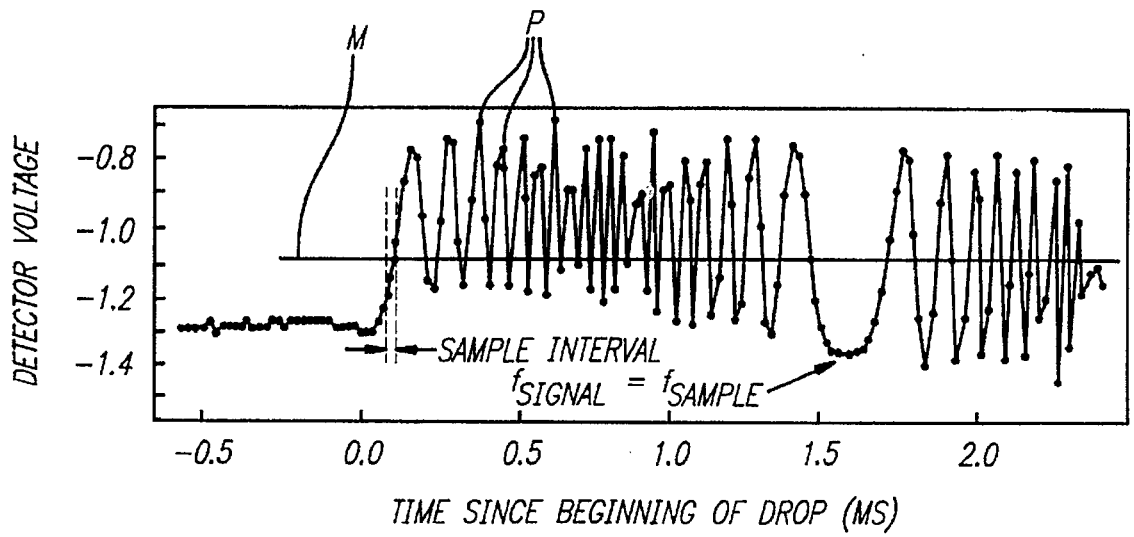
FIG. 7 is a graph of the output voltage of the light detector over time, as the retroreflector falls toward the optical fiber.
Figure 8:
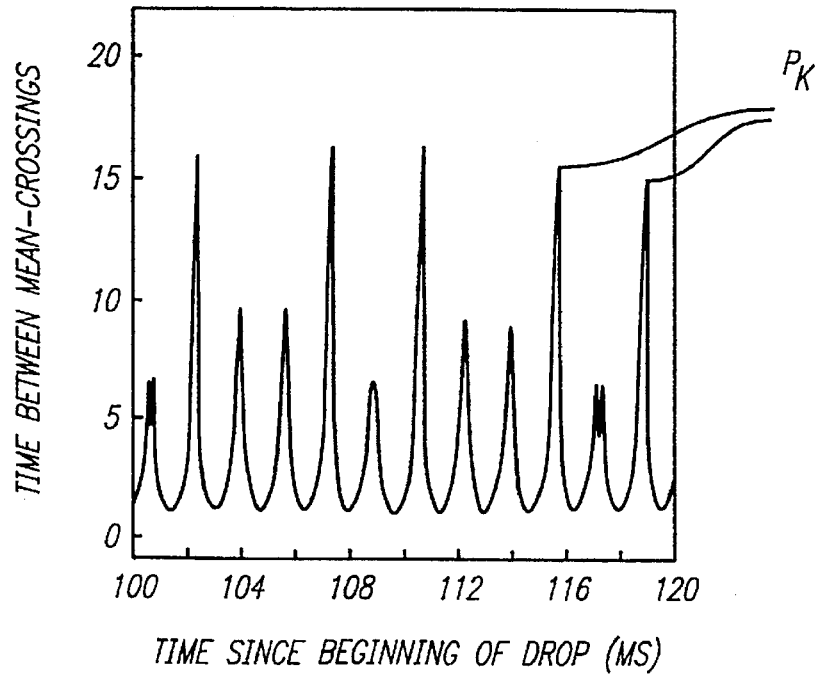
FIG. 8 is a graph of the time between mean-crossings of the voltage signal from the light detector over time.

In reference to FIGS. 6, 7, and 8, in obtaining initial estimates of g and $v_0$, a sample signal from the detector 104 is read into the memory of the computer 130, as indicated at block 176 in FIG. 6. FIG. 7 shows an example of one such signal, wherein the line "M" represents the mean of the signal (i.e., the average offset) and the points "P" represent the points at which the A/D converter 154 samples the output signal of the detector 104.

Note that the points "P" are equally spaced along the horizontal axis in FIG. 7 by a period denoted in FIG. 7 as a "sample interval". Note further that the time from when the sampled signal crosses the mean line "M" to the next subsequent crossing of the line "M" (termed herein the "time between mean crossings") varies with the frequency of the signal from the detector 104, and is at a maximum when the frequency of the signal from the detector 104 equals the sample interval.

As indicated at block 178, the times between mean crossings of the average offset are calculated, and then listed vs. time as indicated at block 180 and shown in FIG. 8. As shown in FIG. 8, peaks "Pk" occur when the time between mean crossings is at a maximum.

Then, as indicated at block 182, the peaks "Pk" are "fitted", i.e., the time at which each peak "Pk" occurs is compared to an integer which represents the ratio of the fringe signal frequency for that peak "Pk" to the sampling frequency. To obtain a crude estimate of the fringe signal frequency $f_{signal}$ for a particular peak "Pk", the equation $f_{signal} \approx 2gt/\lambda$ is used, with g being estimated to be 9.8 m/sec$^2$.

Then, the crude estimate of the fringe signal frequency for a particular peak "Pk" is divided by the sampling frequency and rounded to the nearest integer. The resulting plot of the times at which each peak "Pk" occurs versus the integer representing the ratio of the fringe signal frequency for that peak "Pk" to the sampling frequency is a straight line, and the slope of the line is equal to the time T between peaks "Pk". Then, $$g = f_{sample} \lambda / 2T,$$

and $$v_0 = -gB,$$

where B=vertical axis intercept of the line.

We have found that the above estimate of g, $v_0$ is sufficiently accurate to ensure convergence.

From block 182, the method of the present invention proceeds to fit the data to equation (2). As indicated at block 184, $x_j$ is set equal to $x_j^0$ and f in equation (2) above is calculated at block 186. Then, at block 188 a least squares fit is performed to determine $\Delta x_j$. Next, at block 190, $x_j$ is set equal to $x_j + \alpha x_j$.

In other words, the solution of equation (2) proceeds iteratively. An estimate $(x_j^0)$ of the initial five values of $x_j$ is made, and the function f and its five partial derivatives are evaluated at $x_j = x_j^0$ for a plurality of the points "P" (i.e., for i times, wherein i is a predetermined number of analysis points set forth in Appendix A).

Then, at block 192, the difference between the presently determined g and the preceding determined g ($\Delta g$, i.e., $\Delta x_5$) is compared to some predetermined minimum z. We have found that in our presently preferred embodiment, when $\Delta g$ is less than about twenty (20) microGal, the next iteration can be expected to produce a $\Delta g$ of less than about two-tenths (0.2) of a microGal, indicating an acceptably precise determination of g. Accordingly, in the preferred embodiment z is equal to 20 microGal, and if $\Delta g$ exceeds z, the process returns to block 186. Otherwise, the process proceeds to block 193 to display "g" and thence to decision block 194.

If at decision block 194 it is determined that the data set being sampled is the last drop, the process proceeds to block 196 wherein the determinations of the gravitational acceleration from a plurality of drops are averaged, and the averaged g is displayed, along with the standard deviation. Otherwise, the process returns to block 176 wherein the next sample drop set is obtained and another calculation of "g" is performed.

As the skilled artisan will appreciate, the process disclosed above depends on digitizing the interference fringe waveform, rather than on timing peaks of the interference fringe waveform, in contrast to prior art methods for determining g. Consequently, systemic error is reduced because fewer processing components are required, compared to prior art processing. For example, no high-pass filter is required; no zero-crossing discriminator is required; and no prescaler is required, all in contrast to prior art methods that depend on timing peaks of the interference fringe waveform. Furthermore, by eliminating many prior art processing components, the present invention is physically relatively compact, to facilitate use in a relatively small pressure vessel for underwater applications.

While the particular gravity meter as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

What is claimed is:

1. A gravity meter, comprising:

a laser for generating a light beam;

an optical fiber having a first end in light communication with the laser and a second end, wherein the second end of the fiber establishes a fixed reflector for reflecting a first portion of the light beam back through the optical fiber and for permitting a second portion of the light beam to propagate through the fixed reflector;

a seismometer mass for holding the fixed reflector to attenuate the propagation of vibrations to the fixed reflector;

a droppable reflector in light communication with the second end of the fiber for reflecting the second portion of the first beam back through the optical fiber; and a detector in light communication with the first and second portions of the light beam for detecting interference fringes generated by the interaction between the first and second portions of the light beam, wherein the interference fringes are representative of the displacement of the droppable reflector relative to the fixed reflector.

2. The gravity meter of claim 1, further comprising an evacuated chamber, wherein the droppable reflector is positioned in the evacuated chamber.

3. The gravity meter of claim 2, further comprising a computer for controlling the elevator and for determining gravitational acceleration based upon the interference fringes.

4. The gravity meter of claim 2, further comprising a waveform digitizer electrically connected to the computer for sampling the interference fringes at a predetermined sampling frequency.

5. The gravity meter of claim 2, further comprising a beam collimator disposed adjacent the second end of the fiber for collimating light and a pressure vessel for holding the laser and reflectors, the pressure vessel including a center ring, a bottom, and a plurality of levelling legs attached to the center ring.

6. The gravity meter of claim 5, wherein the levelling legs include respective lead screws disposed in respective cylinders, each lead screw being reciprocatingly disposed in its associated cylinder for adjusting the orientation of the pressure vessel with respect to the earth.

7. An apparatus comprising:

a light source for generating a light beam;

an optical fiber optically coupled to the light source for transmitting the light beam;

a first reflector for reflecting the light beam from the optical fiber, the first reflector being positioned such that no relative motion occurs between the first reflector and the optical fiber;

a droppable second reflector for reflecting the light beam from the optical fiber, wherein the second reflector can be selectively accelerated under the influence of gravity relative to the optical fiber, and wherein reflected light from the second reflector interferes with reflected light from the first reflector to generate interference fringes; and a light processor positioned for receiving the interference fringes and determining the magnitude of the acceleration of the second reflector relative to the first reflector in response thereto.

8. The apparatus of claim 7, wherein the optical fiber is formed with an end for establishing the first reflector, the light source is a laser, and the apparatus further comprises a seismometer mass for holding the end of the optical fiber to attenuate the propagation of vibrations through the mass to the end.

9. The apparatus of claim 8, wherein the light processor includes a photon detector and a computer electrically connected to the detector.

10. The apparatus of claim 9, further comprising a waveform digitizer electrically connected to the computer for sampling the interference fringes at a predetermined sampling frequency.

11. The apparatus of claim 10, further comprising a beam collimator disposed adjacent to the end of the fiber for collimating light, a pressure vessel for holding the laser and reflectors, and an elevator for holding the second reflector, the pressure vessel including a center ring, a bottom, and a plurality of levelling legs attached to the center ring, wherein the levelling legs include respective lead screws disposed in respective cylinders, each lead screw being reciprocatingly disposed in its associated cylinder for adjusting the orientation of the pressure vessel with respect to the earth, and wherein the elevator is coupled to the center ring, the bottom of the pressure vessel includes a resilient surface, and the second reflector is mounted on the resilient surface.

* * * * *